Aug. 21, 1956        G. W. DEXTER        2,760,157

RADIO FREQUENCY CURRENT DETECTION AND MEASURING DEVICES

Filed Oct. 31, 1952

INVENTOR.
GEORGE W. DEXTER
BY George Sipkin
George E. Pearson
ATTORNEYS

# United States Patent Office 2,760,157
Patented Aug. 21, 1956

2,760,157

RADIO FREQUENCY CURRENT DETECTION AND MEASURING DEVICES

George W. Dexter, Los Angeles, Calif., assignor to the United States of America as represented by the Secretary of the Navy Application October 31, 1952, Serial No. 317,956

5 Claims. (Cl. 324—95)

This invention relates to electrical measuring devices and more particularly to a radio frequency current detection and measuring device.

It is often necessary or desirable to be able to measure current of radio frequency existing in the outer sheath of a conductor, as for instance an antenna or a coaxial line feeding an antenna. Efforts have been made in the past to measure this current by use of a loop-probe, but this has proved impractical for the most part since the coupling between the loop and the element carrying the current changes considerably with a slight variation of spacing.

It is accordingly an object to provide an improved electrical measuring device that will detect and indicate high frequency current.

A further object is the provision of a high frequency current detecting and indicating device for measuring current along an antenna or a coaxial line feeding an antenna.

A still further object is to provide a current measuring device which introduces only small discontinuities in impedance in a conductor being measured.

Still another object is to provide an electrical measuring instrument which may be used over a wide range of high frequencies.

A further object is to provide an electrical measuring instrument which may be placed into measuring position without interrupting the physical continuity of the conductor on which the electrical measurement is to be made.

A still further object is the provision of an electrical measuring instrument which indicates current in a conductor without being in contact with the conductor.

Still a further object is the provision of an electrical measuring instrument which measures the electromagnetic fields surrounding the conductor.

A further object is the provision of an electrical measuring instrument which may be readily and easily moved from place to place along a conductor for taking measurements at various points along the conductor.

Still a further object is to provide an electrical measuring instrument which may be quickly and easily placed into and removed from measuring position.

Other objects and many of the attendant advantages of this invention will be readily appreciated as the same becomes better understood by reference to the following detailed description when considered in connection with the accompanying drawings wherein.

Figure 1:
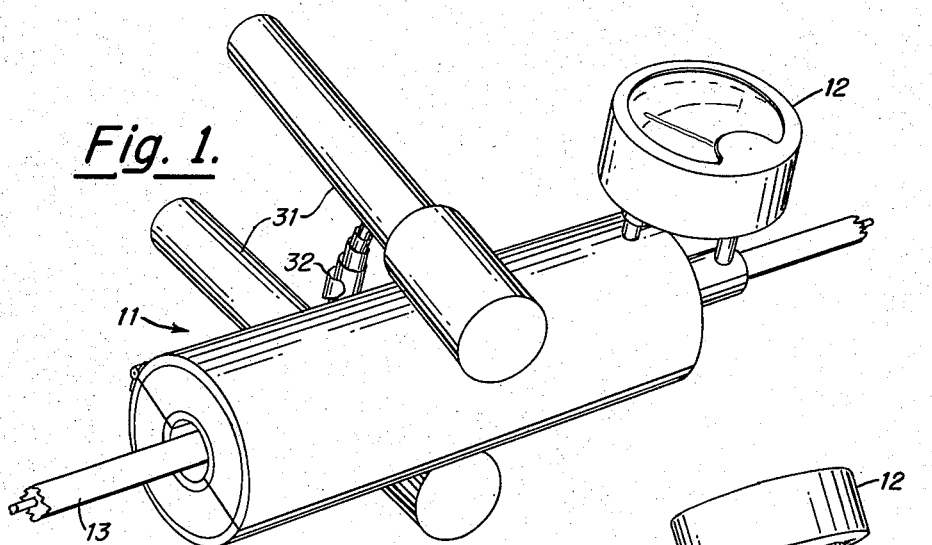
Fig. 1 is a view in perspective of an embodiment of the invention.

Referring to the drawings in which a physical embodiment of the invention is illustrated, there is provided a pickup element generally designated 11 and a current indicating meter generally designated 12 operatively connected thereto for indicating a current I in the outer sheath of a conductor 13 upon which current measurements are desired to be taken.

Figure 2:
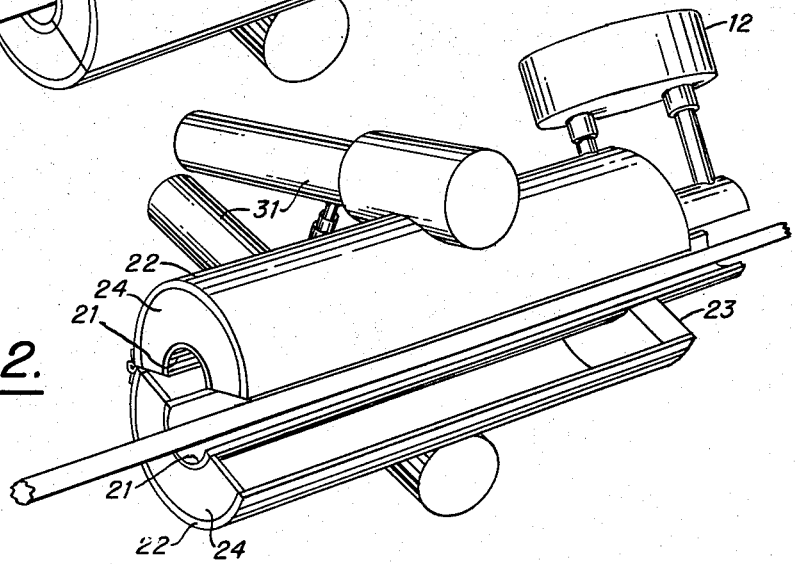
Fig. 2 is a further view in perspective of the embodiment shown in Fig. 1, wherein the same is in opened position.
Figure 3:
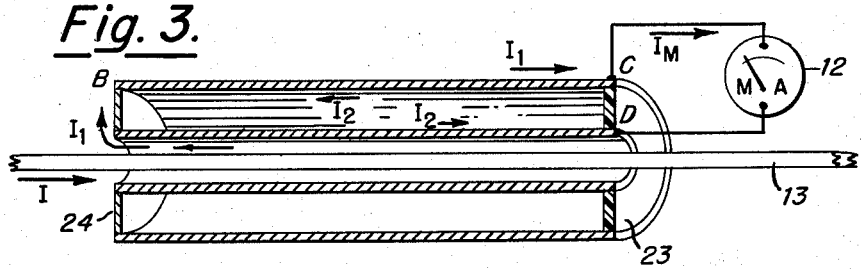
Fig. 3 is a schematic view of the invention in section showing the flow of current therein.

In the embodiment shown in Figures 1 and 2 the pickup element 11 is comprised of a pair of semicylindrical shells each of which is comprised of a pair of concentrically arranged semicylindrical conductor members 21 and 22.

Each pair of concentric semicylindrical conductor members has a dielectric spacer half-disc 23 across one end C–D thus making this end effectively open, and a shorting spacer half-disc 24 across the opposite end B.

Provision is made for opening and closing the two shells to facilitate the placing thereof around the conductor to be measured. In the illustrated embodiment this takes the form of a hinge which connects the two outer semicylindrical conductor members 22, 22 together, as shown in Figures 1 and 2. Attached to these two outer members is a pair of non-conducting handles 31 which provide a means for applying leverage to open the two semi-cylindrical shell sections. Connected between the two handles is a spring 32 which biases the handles outwardly so that the two shells are normally held together to effectively form a section of coaxial line shorted at one end and open at the opposite end.

Secured effectively to the inner and outer semicylindrical members 21 and 22 of one of the shells is a meter 12 for indicating R. F. current flow. This may be any R. F. current indicating mechanism of known design, and since the construction of it per se does not form a part of this invention it will not be further described herein.

The presently disclosed embodiment of the invention thus consists of a short section of a coaxial line, with its center conductor tubular and surrounding the wire carrying the current to be measured, as shown in Figure 1. One end of the transmission line is short circuited at B and the other end is open, with a meter connected across the open end.

If a perfect conductor is assumed for the measuring line, $$I_1 = I \qquad (1)$$

The current $I_1$ has parallel paths at the junction consisting of the meter and the impedance of the short circuited length of the transmission line across CD. Let the current through the meter be designated by $I_m$ and the current through the open end of the transmission line be $I_2$. The current relationship is, then $$I = I_1 = I_2 + I_m \qquad (2)$$

The impedance of the meter M and the impedance across the open end C–D of the pickup member will vary with the frequency of current being measured, and these changes of impedance will alter the distribution of current flow in the meter and directly across C–D. This distribution change will alter the ratio R which is the ratio of the current in the conductor being measured to the current in the meter, and which is the multiplier to be applied to the meter reading to determine the current in the conductor under measurement.

The impedance of a short circuited lossless transmission line of length less than $$\frac{\lambda}{4}$$

is given as $$Z = jX_L = jZ_0 \tan \frac{2\pi l}{\lambda} \qquad (3)$$

Since the voltage across the transmission line and the voltage across the meter must be the same, $$jI_2 X_L = I_m Z_m = E_m \qquad (4)$$

where:

$Z_m$ = impedance of meter
$E_m$ = voltage across meter or $$I_2 = \frac{I_m Z_m}{jX_L} \quad (5)$$

Substituting (5) in (2), $$I = \frac{I_m Z_m}{jX_L} + I_m$$

then $$\frac{I}{I_m} = 1 + \frac{Z_m}{jX_L}$$

If this ratio is designated by R, then $$R = 1 - j\frac{Z_m}{X_L}$$

Substituting $$Z_m = R_m + jX_m$$

and rationalizing, $$|R| = \sqrt{\left(1 + \frac{X_m}{X_L}\right)^2 + \left(\frac{R_m}{X_L}\right)^2} \quad (6)$$

Equation 3 can be approximated by $$X_L = \frac{2\pi l Z_0}{\lambda}$$

for a length of line short compared with a wavelength. This approximation is justifiable since a requirement on the line is that it be short compared with a wavelength for reasons to be given later. This approximation for $X_L$ can be substituted in (6):

$$|R| = \sqrt{\left[1 + \frac{\lambda X_m}{2\pi l Z_0}\right]^2 + \left[\frac{\lambda R_m}{2\pi l Z_0}\right]^2}. \quad (7)$$

Equation 7 can be written in terms of the known parameters:

$$R = \sqrt{\left[1 + \frac{cX_m}{2\pi l j Z_0' 10^6}\right]^2 + \left[\frac{cR_m}{2\pi l f Z_0' 10^6}\right]^2} \quad (7a)$$

where: $c$ = velocity of light in centimeters per second. Now since $X_m$ can be written in terms of the inductance of the meter, which in many R. F. meters is effectively a constant value over the range of frequencies involved, $$R = \sqrt{\left[1 + \frac{2\pi f c L_m}{2\pi f Z_0' 10^6}\right]^2 + \left[\frac{cR_m}{2\pi l f Z_0' 10^6}\right]^2}$$

which reduces to $$R = \sqrt{\left[1 + \frac{cL_m}{10^6 l Z_0}\right]^2 + \left[\frac{cR_m}{2\pi l f Z_0' 10^6}\right]^2} \quad (7b)$$

where:

$L_m$ = inductance of meter in microhenries
$c$ = velocity of light in centimeters per second
$l$ = length of line in centimeters
$Z_0$ = characteristic impedance of line in ohms
$f$ = frequency in megacycles per second
$R_m$ = meter resistance in ohms Finally, the absolute value can be understood, and $$I = RI_m \quad (8)$$

Thus, if the meter components of impedance can be determined and the parameters of the transmission line are known, R can be determined for any frequency within the approximation that the length of line is short compared with a wavelength.

The size of the transmission line element used in the meter will determine the amount of distortion of the current distribution on the antenna or line introduced by the meter and the accuracy of the current measurement at any one point on the antenna or line. It is necessary that the length of line be short compared to a wavelength at the upper frequency limit to minimize such effects.

Obviously many modifications and variations of the present invention are possible in the light of the above teachings. It is therefore to be understood that within the hope of the appended claims the invention may be practiced otherwise than as specifically described.

Having described the invention, what is claimed is:

1. Apparatus for detecting and transmitting for measurement thereof an R. F. current, comprising a first pair of electrically conductive semicylindrical shells hingedly connected in concentric relation along an axial edge of each, a second pair of electrically conductive semicylindrical shells of smaller diameter than said first pair of shells and concentrically arranged therewithin and spaced therefrom, an electrically conductive wall connecting said first and second pairs of shells to thereby form a short circuited coaxial line, said line having a length less than one-fourth the wavelength of said current to be measured, and a current indicating device connected across said first and second pairs of shells of said line and spaced from the short circuited end thereof.

2. Apparatus for detecting and transmitting for measurement thereof an R. F. current, comprising a first pair of electrically conductive semicylindrical shells hingedly connected in concentric relation along an axial edge of each, a second pair of electrically conductive semicylindrical shells of smaller diameter than said first pair of shells and concentrically arranged therewithin, an electrically conductive wall connecting said first and second pairs of shells to thereby form a short circuited coaxial line, non-conductive levers secured to said first pair of shells for opening said line about its hinged connection to permit said line to be placed around a conductor having a current to be measured, said line having a length less than one-fourth the wavelength of said current to be measured, and a current indicating device connected across said first and second pairs of shells of said line and spaced from the short circuited end thereof.

3. R. F. electromagnetic field detection and measuring apparatus comprising a radio frequency ammeter, and a pair of sections for enclosing a conductor having a current to be measured, said sections each having a length less than one-fourth the wavelength of said current to be measured, each section comprising two concentrically arranged semicylindrical members in spaced relation, said semicylindrical members being composed of electrically conductive material and being shorted together at one axial end thereof and having their opposite ends joined to the leads of said radio-frequency ammeter.

4. Apparatus as in claim 3 wherein said sections are hingedly connected together along an axial circumferentially adjacent edge of each.

5. Apparatus as in claim 4 wherein lever means is provided on said sections for moving said sections angularly about the pivot point formed by said hinge connection.

References Cited in the file of this patent

UNITED STATES PATENTS

| | | |
|---|---|---|
| 1,999,250 | Mollath | Apr. 30, 1935 |
| 2,580,679 | Hansen | Jan. 1, 1952 |
| 2,630,473 | Woodward | Mar. 3, 1953 |

FOREIGN PATENTS

| | | |
|---|---|---|
| 327,837 | Great Britain | Apr. 17, 1930 |